Patented Dec. 24, 1935

2,025,391

UNITED STATES PATENT OFFICE 2,025,391

PRODUCTION OF NITRIC OXIDE AND HYDROGEN CHLORIDE FROM NITROSYL CHLORIDE

Oskar Kaselitz, Berlin, Germany

No Drawing. Application December 29, 1933, Serial No. 704,483. In Germany February 2, 1933

8 Claims. (Cl. 23—157)

My invention refers to the utilization of nitrosyl chloride and one of its objects is to provide means for converting nitrosyl chloride into other useful compounds and more especially for recovering therefrom nitric oxide and hydrochloric acid.

Hitherto the decomposition of nitrosyl chloride into its components and the conversion of these components into other useful products and more especially into useful nitrogen compounds has been tried in different ways, partly by means of an oxidizing decomposition leading to nitrogen dioxide and to nitric acid, respectively.

It has further been tried to recover the nitrogen of nitrosyl chloride by reduction, for instance with the aid of iron, tin, sulfur, carbon monoxide and moist coal, whereby nitrogen monoxide and the corresponding chlorides, $FeCl_3$, $SnCl_4$, $S_2Cl_2$ and $COCl_2$ or $CO_2$ and $HCl$ can be obtained. It is however also possible to reduce nitrosyl chloride by means of hydrogen, but as far as hitherto known a mixture of nitrosyl chloride and hydrogen is very slow to react under ordinary conditions. On the other hand, if catalytically active metals, such as platinum, palladium or nickel are present, a violent reaction will occur, which may even take the form of an explosion, free nitrogen or ammonia and ammonium chloride or other compounds of nitrogen and hydrogen being formed.

The present invention aims at carrying through a reaction between nitrosyl chloride and hydrogen which is free from secondary reactions and which enables the reduction of nitrosyl chloride to NO and HCl, to be carried through on a commercial scale according to the equation $$2NOCl + 2H = 2HCl + 2NO.$$

I have found that I can avoid the formation of nitrogen or $NH_4Cl$ and can obtain the perfect reaction according to the above equation by heating a mixture of nitrosyl chloride and hydrogen or gas mixtures containing nitrosyl chloride and hydrogen to a temperature ranging between 150 and 500° C., at which temperatures nitrosyl chloride is dissociated to some degree, as has been shown by Dixon in "Zeitschrift für physikalische Chemie" (Bodenstein - Festband), 1931 (p. 679–686). I have further found that in the presence of catalysts accelerating the decomposition of NOCl the reaction will proceed smoothly and the temperature of the reaction may be considerably lower.

As catalysts I may use the oxydic and the chloridic compounds of the heavy and the light metals, for instance $Al_2O_3$, $MnO_2$, $MnCl_2$, $Cr_2O_3$ and $SiO_2$ and active carbon. In contradistinction thereto the readily reducible compounds leading to metals, such as Pt, Pd or Ni, which cause a powerful condensation of hydrogen on their surfaces, are not adapted for this purpose.

I have further found that the reaction according to the above equation can be carried through also at ordinary temperature if absorbable rays, such as ordinary light rays are allowed to act on the mixture of notrosyl chloride and hydrogen; in that case the reaction will proceed smoothly and with good yields. Irradiation of the mixture with rays of long wave length suffices to overcome even at ordinary temperature the indifference of the two components to react with each other.

The hydrochloric acid formed in the reaction is separated from the nitrogen monoxide by washing with water. The nitrogen monoxide is converted into nitrogen dioxide by the reaction with oxygen and can thus be utilized for the production of nitric acid and nitrates.

I am aware that a mixture of $H_2$ and $Cl_2$, if acted upon by light rays, will combine by photochemical reaction. However this reaction has the character of an explosion, the mixture being therefore called chlorine detonating gas, and the reaction could not therefore be utilized in a commercial manner. This led to the belief that the reaction of NOCl with $H_2$ would not proceed in a moderate manner either.

In accordance with this invention the danger of explosion is excluded by operating at a relatively low temperature and in the presence of suitable catalysts other than platinum, palladium and nickel, which possess an unduly high reactivity.

In practising my invention I may for instance proceed as follows:

Example 1

A mixture of equal parts by volume NOCl and $H_2$ is passed at the rate of 2 litres per hour through an unobstructed reaction tube heated to 350° C. 90% of the nitroyl chloride in the gas mixture is thus converted into NO and HCl.

Example 2

If the process described with reference to Example 1 is carried through in the presence of 20 grams granulated $MnO_2$ prepared by decomposing $KMnO_4$ with concentrated sulfuric acid, 96% of the NOCl will be found to be converted into NO and HCl.

Example 3

When operating under the same conditions as recited in Example 1, however in the presence of 20 grams $Al_2O_3$ produced from precipitated $Al_2(OH)_3$, 97% of the NOCl will be converted into NO and HCl.

Example 4

When operating under the same conditions as recited in Example 1, however at a temperature of 200° C. and in the presence of 20 grams activated carbon, 99% of the NOCl were decomposed into NO and HCl.

Example 5

If a gas mixture of the same composition as in Example 1 is passed at ordinary temperature through a gas tube or vessel acted upon by the rays of an ordinary incandescent lamp of 60 watt, about 45% of the NOCl will be found to be decomposed into NO and HCl, while without such irradiation no decomposition occurs.

Various changes may be made in the details disclosed in the foregoing specification without departing from the invention or sacrificing the advantages thereof.

I claim:—

1. The method of converting a mixture of nitrosyl chloride and hydrogen into nitrogen monoxide and hydrogen chloride comprising heating such mixture to a temperature ranging between 150 and 500° C.

2. The method of converting a mixture of nitrosyl chloride and hydrogen into nitrogen monoxide and hydrogen chloride comprising heating such mixture to a temperature ranging between 150 and 500° C. in the presence of a substance furthering the decomposition of NOCl by catalytic action.

3. The method of converting a mixture of nitrosyl chloride and hydrogen into nitrogen monoxide and hydrogen chloride comprising heating such mixture to a temperature ranging between 150 and 500° C. in the presence of a compound of the group constituted by the oxygen and the chlorine compounds of the metals furthering the decomposition of nitrosyl chloride by catalytic action.

4. The method of converting a mixture of nitrosyl chloride and hydrogen into nitrogen monoxide and hydrogen chloride comprising heating such mixture to a temperature ranging between 150 and 500° C. in the presence of a metal oxide furthering the decomposition of nitrosyl chloride by catalytic action.

5. The method of converting a mixture of nitrosyl chloride and hydrogen into nitrogen monoxide and hydrogen chloride comprising heating such mixture to a temperature ranging between 150 and 500° C. in the presence of a metal chloride furthering the decomposition of nitrosyl chloride by catalytic action.

6. The method of converting a mixture of nitrosyl chloride and hydrogen into nitrogen monoxide and hydrogen chloride comprising heating such mixture to a temperature ranging between 150 and 500° C. in the presence of activated carbon.

7. The method of converting a mixture of nitrosyl chloride and hydrogen into nitrogen monoxide and hydrogen chloride comprising exposing such mixture to the action of rays absorbable by the mixture.

8. The method of converting a mixture of nitrosyl chloride and hydrogen into nitrogen monoxide and hydrogen chloride comprising exposing such mixture to the action of light rays.

OSKAR KASELITZ.